(12) United States Patent
Marik et al.

(10) Patent No.: US 11,193,690 B2
(45) Date of Patent: Dec. 7, 2021

(54) SHARED PARAMETERIZATION OF DIFFERENTIAL PRESSURE SET POINTS IN HEATING, VENTILATION, AND AIR-CONDITIONING SYSTEMS

(71) Applicant: Honeywell International Inc., Morris Plains, NJ (US)

(72) Inventors: Karel Marik, Revnice (CZ); Petr Endel, Prague (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 110 days.

(21) Appl. No.: 16/598,757

(22) Filed: Oct. 10, 2019

(65) Prior Publication Data
US 2021/0108822 A1    Apr. 15, 2021

(51) Int. Cl.
*F24F 11/63*    (2018.01)
*G05B 13/04*    (2006.01)
*F24F 11/46*    (2018.01)
*F24F 110/40*   (2018.01)

(52) U.S. Cl.
CPC .............. *F24F 11/63* (2018.01); *F24F 11/46* (2018.01); *G05B 13/042* (2013.01); *F24F 2110/40* (2018.01)

(58) Field of Classification Search
CPC ........ F24F 11/63; F24F 11/46; F24F 2110/40; G05B 13/042
See application file for complete search history.

(56) References Cited

U.S. PATENT DOCUMENTS 9,638,435 B2 * 5/2017  Ambriz ................ F24F 11/30
10,352,578 B2 * 7/2019 Adkerson .......... G05D 16/2073

* cited by examiner

*Primary Examiner* — Mohammad Ali
*Assistant Examiner* — Sheela Rao
(74) *Attorney, Agent, or Firm* — Alston & Bird LLP (57) ABSTRACT

Method, apparatus and computer program product for managing a heating, ventilation, and air-conditioning (HVAC) system. In one example, a method includes obtaining a differential pressure reading from each differential pressure sensor of the plurality of differential pressure sensors; obtaining a differential pressure set point for each differential pressure sensor; applying a shared set point parameter to each differential pressure set point for a differential pressure sensor in order to generate a parameterized set point for the differential pressure sensor; for each differential pressure sensor, generating a demand indicator for the differential pressure sensor based on the differential pressure reading from the differential pressure sensor and the parameterized set point for the differential pressure sensor; and performing the supervisory control based on at least one demand indicator.

20 Claims, 3 Drawing Sheets

SHARED PARAMETERIZATION OF DIFFERENTIAL PRESSURE SET POINTS IN HEATING, VENTILATION, AND AIR-CONDITIONING SYSTEMS

BACKGROUND

Applicant has identified many deficiencies and problems associated with existing methods, apparatus, and systems related to managing heating-ventilation, and air-conditioning (HVAC) systems. Through applied effort, ingenuity, and innovation, many of these identified deficiencies and problems have been solved by developing solutions that are in accordance with embodiments of the present disclosure, many examples of which are described in detail herein.

BRIEF SUMMARY

Various embodiments of the present invention improve operational efficiency and reliability of HVAC system optimizers by utilizing computationally efficient models of parameterizing set points associated with differential pressure sensors in those systems. Furthermore, various embodiments of the present invention improve accuracy of HVAC system models by reducing dimensionality of various differential pressure set points and overcoming non-linear effects introduced by typical local control implementations of such multi-sensor HVAC systems. Consequently, various embodiments of the present invention significantly reduce manual effort for set-up of HVAC system optimizers, and significantly expand capability of HVAC systems to manage comfort conditions of larger buildings and campuses which have more complex structures.

In general, embodiments of the present disclosure provide methods, apparatus, systems, devices, and/or the like for managing HVAC systems by utilizing shared parameterization of differential pressure set points associated with differential pressure sensors of such HVAC systems. In accordance with one aspect, an apparatus is provided. The apparatus comprises at least one processor and at least one non-transitory memory comprising program code. The at least one non-transitory memory and the program code are configured to, with the at least one processor, cause the apparatus to perform a method for performing supervisory control of a heating, ventilation, and air-conditioning (HVAC) system using a plurality of differential pressure sensors associated with the HVAC system, the method comprising: obtaining a differential pressure reading from each differential pressure sensor of the plurality of differential pressure sensors; obtaining a differential pressure set point for each differential pressure sensor of the plurality of differential pressure sensors; applying a shared set point parameter to each differential pressure set point for a differential pressure sensor of the plurality of differential pressure sensors in order to generate a parameterized set point for the differential pressure sensor; for each differential pressure sensor of the plurality of differential pressure sensors, generating a demand indicator for the differential pressure sensor based on the differential pressure reading from the differential pressure sensor and the parameterized set point for the differential pressure sensor; and performing the supervisory control based on at least one demand indicator for a differential pressure sensor of the plurality of differential pressure sensors.

In some embodiments, generating the demand indicator for a differential pressure sensor of the plurality of differential pressure sensors comprises generating a deviation measure between the parameterized set point for the differential pressure sensor and the differential pressure reading from the differential pressure sensor. In some embodiments, shared set point parameter is selected from a configurable differential pressure range associated with the HVAC system. In some embodiments, each differential pressure sensor of the plurality of differential pressure sensors is associated with a distribution branch of a plurality of distribution branches associated with the HVAC system, and the demand indicator for a differential pressure sensor of the plurality of differential pressure sensors indicates whether the building branch associated with the differential sensor is in a comfort state as defined by the parameterized set point for the differential pressure sensor. In some embodiments, each differential pressure sensor of the plurality of differential pressure sensors is associated with a local pressure controller associated with the HVAC system, and performing the supervisory control comprises modifying operation of the local pressure controller of the plurality of local pressure controllers.

In some embodiments, performing the supervisory control comprises identifying a most deprived differential pressure sensor of the plurality of differential pressure sensors having a maximum demand indicator; and performing the supervisory control based on the maximum demand indicator. In some embodiments, the shared set point parameter is determined based on an existing set point range associated with the HVAC system. In some embodiments, the method further comprises obtaining an updated set point range associated with the HVAC system; applying the updated shared set point parameter to each differential pressure set point for a differential pressure sensor of the plurality of differential pressure sensors in order to generate an updated parameterized set point for the differential pressure sensor; for each differential pressure sensor of the plurality of differential pressure sensors, generating an updated demand indicator for the differential pressure sensor based on the differential pressure reading from the differential pressure sensor and the updated parameterized set point for the differential pressure sensor; and performing the supervisory control based on at least one updated demand indicator for a differential pressure sensor of the plurality of differential pressure sensors.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention. It will be appreciated that the scope of the invention encompasses many potential embodiments in addition to those here summarized, some of which will be further described below.

BRIEF DESCRIPTION OF THE DRAWINGS

Having thus described some embodiments in general terms, references will now be made to the accompanying drawings, which are not necessarily drawn to scale, and wherein:

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a device is described herein to receive data from another device, it will be appreciated that the data may be received directly from another device or may be received indirectly via one or more intermediary devices, such as, for example, one or more servers, relays, routers, network access points, base stations, hosts, and/or the like (sometimes referred to herein as a "network"). Similarly, where a device is described herein to send data to another device, it will be appreciated that the data may be sent directly to another device or may be sent indirectly via one or more intermediary devices, such as, for example, one or more servers, relays, routers, network access points, base stations, hosts, and/or the like.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

Overview

Various embodiments of the present invention improve operational efficiency and reliability of HVAC system optimizers by utilizing computationally efficient models of parameterizing set points associated with differential pressure sensors in those systems. Furthermore, various embodiments of the present invention improve accuracy of HVAC system models by reducing dimensionality of various differential pressure set points and overcoming non-linear effects introduced by typical local control implementations of such multi-sensor HVAC systems. Consequently, various embodiments of the present invention significantly reduce manual effort for set-up of HVAC system optimizers, and significantly expand capability of HVAC systems to manage comfort conditions of larger buildings and campuses which have more complex structures.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally, or alternatively, the device may include fixed devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
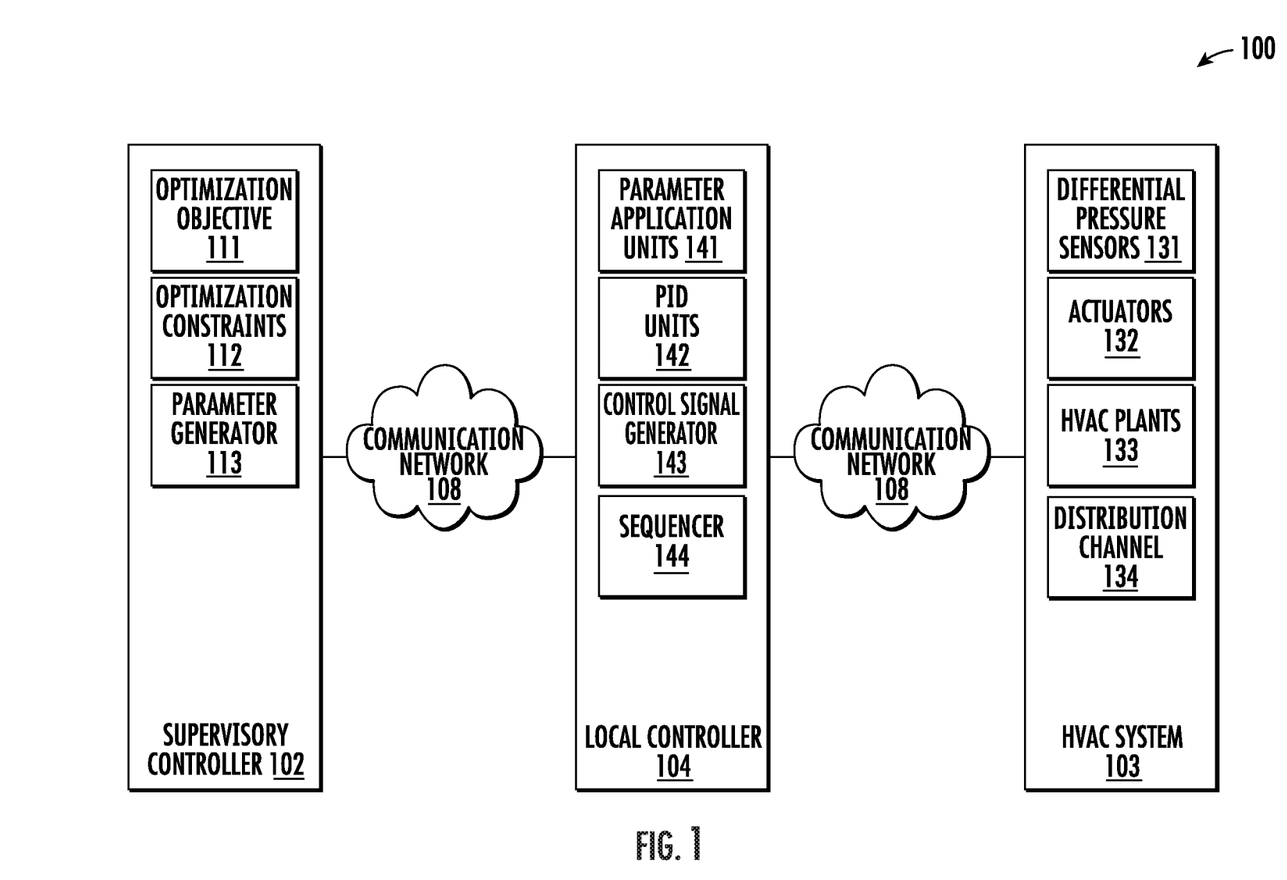
FIG. 1 is an example system architecture within which embodiments of the present disclosure may operate.

FIG. 1 depicts an architecture 100 for performing supervisory control of a HVAC system 103. The architecture 100 includes a supervisory controller 102 that interacts with a local controller 104, which in turn interacts with the HVAC system 103. The supervisory controller 102 is configured to maintain an optimization objective 111 and one or more optimization constraints 112 each defining a differential pressure set point for a differential pressure sensor 131 of the HVAC system 103. The supervisory controller 102 is further configured to, using a parameter generator 113 and based on the optimization objective 111 and the optimization constraints 112, generate a shared set point parameter for the local controller 104. The local controller 104 is configured to generate supervisory control signals that control the operation of the HVAC system 103 based on the differential pressure sensor readings provided by the differential pressure sensors 131 and the shared set point parameter.

Interactions between the supervisory controller 102 and the local controller 104 as well as interactions between the local controller 104 and the HVAC system 103 may be performed using one or more communication networks, such as the communication network 108. The communication network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 108 may include a cellular telephone, a 902.11, 902.16, 902.20, and/or WiMax network. Further, the communication network 108 may include a public network, such as the Internet, a private network, such as an intranet, or combinations thereof, and may utilize a variety of networking protocols now available or later developed including, but not limited to TCP/IP based networking protocols. In one embodiment, the protocol is a custom protocol of JSON objects sent via a Websocket channel. In one embodiment, the protocol is JSON over RPC, JSON over REST/HTTP, and the like.

The HVAC system 103 is configured to maintain desired comfort levels for one or more buildings and/or one or more campuses in accordance with one or more desired energy cost models. The comfort model maintained by the HVAC system may be defined based on one or more of temperature, humidity, carbon dioxide level, etc. To modify comfort levels and/or energy consumption levels, the HVAC system 103 may modify one or more HVAC operational variables, such as one or more of water temperatures, air temperatures, water pump speeds, fan speeds, etc.

The HVAC system 103 includes one or more actuators 132, a distribution channel 134, differential pressure sensors 131, and HVAC plants 133. The actuator 132 (e.g., a water pump or air fan) controls distribution of a cooling agent and/or a heating agent (e.g., hot water, hot air, chilled water, cool air, etc.) within the distribution channel 134, where the distribution channel 134 may include water pipes or air vents. The distribution channel 134 may include various distribution branches, each of which may be associated with a physical zone of the buildings and/or campuses covered by the HVAC system 103.

Each differential pressure sensor 131 may calculate differential pressures (e.g., differential water pressures or differential air pressures) within a distribution branch and provide its generated differential pressure readings to the local controller 104 via the communication network 108. The local controller 104 may then process the differential pressure readings in accordance with its enforced supervisory control strategy to generate supervisory control signals that are in turn transmitted via the communication network 108 to a sequencer 144 (e.g., a pump sequencer). The sequencer 144 in turn changes operations of the actuator 132, which in turn affects the operation of the HVAC plants 133 (e.g., chiller plants, boiler plants, ventilation plants), leading to changes in HVAC operational variables in different physical zones of the buildings and/or campuses covered by the HVAC system 103.

The local controller 104 includes parameter application units 141, proportional-integral-derivative (PID) units 142, a control signal generator 143, and the sequencer 144. The parameter application units 141 are configured to obtain, from the supervisory controller 102, set point data for the differential pressure sensors 131 defining a differential pressure set point for each differential pressure sensor 131 as well as a shared set point parameter from the parameter generator 113 of the supervisory controller 102, and apply the shared set point parameter to each differential pressure set point for a differential pressure sensor 131 to generate a parameterized set point for the differential pressure sensor 131. The PID units 142 are configured to generate a demand indicator for each differential pressure sensor 131 based on a differential pressure reading received from the differential pressure sensor 131 and the parameterized set point for the differential pressure sensor 131, where the demand indicator for a differential pressure sensor 131 may indicate a desired correction in the HVAC operational variables required to address deviation of the differential pressure reading received from the differential pressure sensor 131 from the parameterized set point for the differential pressure sensor 131. The control signal generator 143 is configured to perform the supervisory control based on at least one demand indicator generated by the PID units 142 (e.g., based on a maximum demand indicator generated by the PID units 113) by generating supervisory control signals and transmitting the supervisory control signals via the communication network 108 to the sequencer 144, which in turn generates sequencing signals configured to modify operations of the actuators 132 of the HVAC system 103.

Figure 2:
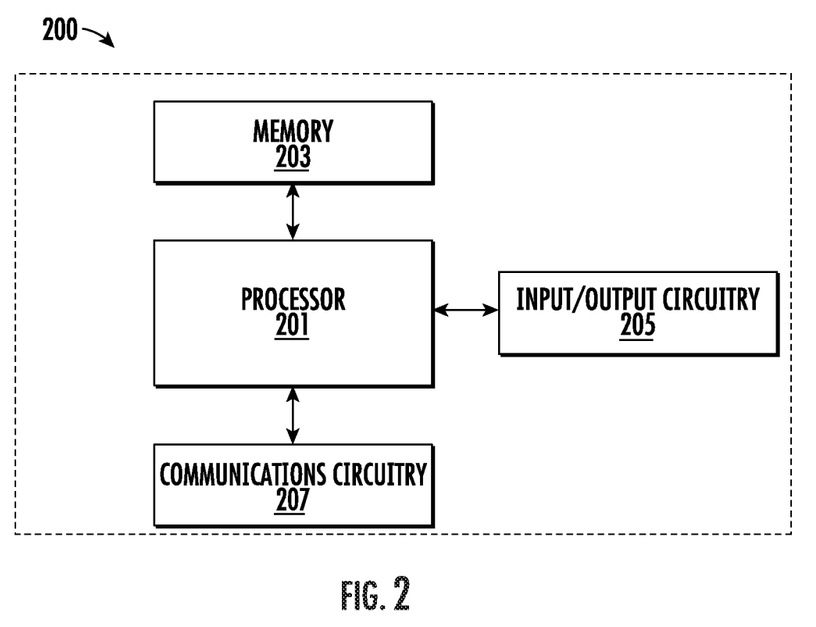
FIG. 2 is a schematic diagram of an example apparatus for a supervisory controller in accordance with one embodiment of the present disclosure.

An example architecture for a supervisory controller 102 is depicted in the apparatus 200 of FIG. 2. As depicted in FIG. 2, the apparatus 200 includes processor 201, memory 203, input/output circuitry 205, and communications circuitry 207. Although these components 201-207 are described with respect to functional limitations, it should be understood that the particular implementations necessarily include the use of particular hardware. It should also be understood that certain of these components 201-207 may include similar or common hardware. For example, two sets of circuitries may both leverage use of the same processor, network interface, storage medium, or the like to perform their associated functions, such that duplicate hardware is not required for each set of circuitries.

In one embodiment, the processor 201 (and/or co-processor or any other processing circuitry assisting or otherwise associated with the processor) may be in communication with the memory 203 via a bus for passing information among components of the apparatus. The memory 203 is non-transitory and may include, for example, one or more volatile and/or non-volatile memories. In other words, for example, the memory 203 may be an electronic storage device (e.g., a computer-readable storage medium). The memory 203 may be configured to store information, data, content, applications, instructions, or the like for enabling the apparatus 200 to carry out various functions in accordance with example embodiments of the present disclosure.

The processor 201 may be embodied in a number of different ways and may, for example, include one or more processing devices configured to perform independently. In some preferred and non-limiting embodiments, the processor 201 may include one or more processors configured in tandem via a bus to enable independent execution of instructions, pipelining, and/or multithreading.

In some preferred and non-limiting embodiments, the processor 201 may be configured to execute instructions stored in the memory 203 or otherwise accessible to the processor 201. In some preferred and non-limiting embodiments, the processor 201 may be configured to execute hard-coded functionalities. As such, if configured by hardware or software methods, or by a combination thereof, the processor 201 may represent an entity (e.g., physically embodied in circuitry) capable of performing operations according to an embodiment of the present disclosure while configured accordingly. Alternatively, as another example, when the processor 201 is embodied as an executor of software instructions, the instructions may specifically configure the processor 201 to perform the algorithms and/or operations described herein when the instructions are executed.

In one embodiment, the apparatus 200 may include input/output circuitry 205 that may, in turn, be in communication with processor 201 to provide output to the user and, in one embodiment, to receive an indication of a user input. The input/output circuitry 205 may comprise a user interface and may include a display, and may comprise a web user interface, a mobile application, a client device, a kiosk, or the like. In one embodiment, the input/output circuitry 205 may also include a keyboard, a mouse, a joystick, a touch screen, touch areas, soft keys, a microphone, a speaker, or other input/output mechanisms.

The communications circuitry 207 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 207 may include, for example, a network interface for enabling communications with a wired or wireless communication network. For example, the communications circuitry 207 may include one or more network interface cards, antennae, buses, switches, routers, modems, and supporting hardware and/or software, or any other device suitable for enabling communications via a network. Additionally, or alternatively, the communications circuitry 207 may include the circuitry for interacting with the antenna/antennae to cause transmission of commands via the antenna/antennae or to handle receipt of commands received via the antenna/antennae.

It is also noted that all or some of the information discussed herein can be based on data that is received, generated and/or maintained by one or more components of apparatus 200. In one embodiment, one or more external systems (such as a remote cloud computing and/or data storage system) may also be leveraged to provide at least some of the functionality discussed herein.

In one embodiment, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 200 may provide or supplement the functionality of particular circuitry. For example, the processor 201 may provide processing functionality, the memory 203 may provide storage functionality, the communications circuitry 207 may provide network interface functionality, and the like.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows of Embodiments of the Present Disclosure

Various embodiments of the present invention improve operational efficiency and reliability of HVAC system optimizers by utilizing computationally efficient models of parameterizing set points associated with differential pressure sensors in those systems. Furthermore, various embodiments of the present invention improve accuracy of HVAC system models by reducing dimensionality of various differential pressure set points and overcoming non-linear effects introduced by typical local control implementations of such multi-sensor HVAC systems. Consequently, various embodiments of the present invention significantly reduce manual effort for set-up of HVAC system optimizers, and significantly expand capability of HVAC systems to manage comfort conditions of larger buildings and campuses which have more complex structures.

Figure 3:
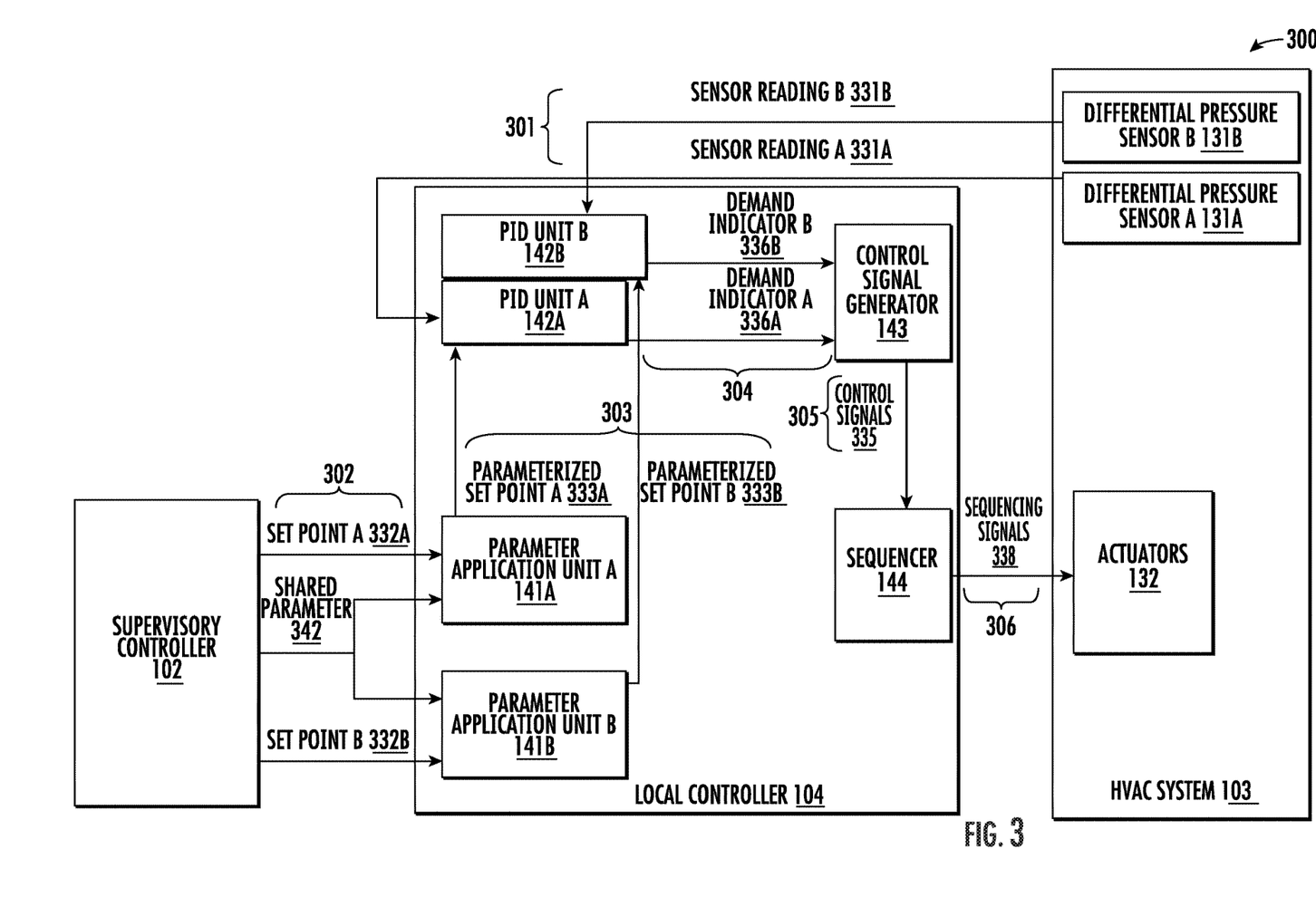
FIG. 3 is a data flow diagram of an example process for performing supervisory controller of a HVAC system.

FIG. 3 is a data flow diagram of an example process 300 for performing supervisory control of an HVAC system 103. Via the various steps/operations depicted in process 300, the local controller 104 can generate sequencing signals 338 that control the operation of the HVAC system 103. The local controller 104 may generate the sequencing signals 338 based on the differential pressure set points 332A-B and the shared set point parameter 342 provided to the local controller 104 by the supervisory controller 102. Although the example process 300 is depicted and described with reference to an HVAC system 103 having two differential pressure sensors A-B 131A-B, a person of ordinary in the relevant art will recognize that the HVAC system 103 may have any number of differential pressure sensors 131.

The process 300 begins at operation 301 when each PID unit 142A-B obtains a differential pressure reading 331A-B generated by a corresponding differential pressure sensor 131A-B. For example, PID unit A 142A, which is associated with differential pressure sensor A 131A, may obtain a differential pressure reading 331A from the differential pressure sensor A 131A; while PID unit B 142B, which is associated with differential pressure sensor B 131B, may obtain a differential pressure reading 331B from the differential pressure sensor B 131B. Although the example process 300 is depicted and described with reference to two PID units 142A-B each associated with a corresponding differential pressure sensor 133A-B, a person of ordinary skill in the art will recognize that any number of PID units may be utilized, e.g., the same PID unit 142 may process differential pressure readings of various differential pressure sensors.

At operation 302, each parameter application unit 141A-B obtain a differential pressure set point 332A-B for a respective differential pressure sensor 131A-B and a shared set point parameter 342 from the supervisory controller 102. In some embodiments, the shared set point parameter 342 indicates a scaling factor for each differential pressure set point 332A-B, such as a scaling factor of one which causes no change in the differential pressure set points 332A-B, a scaling factor that is smaller than one and causes a reduction in the value of the differential pressure set points 332A-B, or a scaling factor that is larger than one and causes an increase in the value of the differential pressure set points 332A-B. In some embodiments, the shared set point parameter 342 is selected from a particular set point parameter range associated with the HVAC system 103, e.g., the set point parameter range [0.9, 1.1] or the set point parameter range [0.7, 1.3].

In some embodiments, the parameter generator 113 of the supervisory controller 102 generates the shared set point parameter 342 by selecting the shared set point parameter 342 from a particular set point parameter range in accordance with an optimization algorithm. In some of those embodiments, optimization algorithm selects the shared set point parameter based on operational (measured) data and defined objective and constraints (e.g., the optimization objective 111 and the optimization constraints 112 maintained by the supervisory controller 102). In some embodiments, the optimization algorithm is configured to maintain a tradeoff between increasing desired comfort levels for various zones of buildings and/or campuses associated with the HVAC system 103 and reducing operational costs of the HVAC system 103. For example, the optimization algorithm may utilize one or more comfort level models and one or more operational cost models derived from the operational (measured) data, for example in a way that minimizes operational costs on given optimization horizons while maintaining desired comfort levels and keeping the shared set point parameter 342 within a particular set point parameter range.

In some embodiments, the parameter generator 113 generates an updated shared set point parameter 342 periodically (e.g., every fifteen minutes). In some embodiments, the parameter generator 113 generates an updated shared set point parameter 342 in response to request to change a supervisory control strategy associated with the supervisory controller 102. In some embodiments, the parameter generator 113 generates an updated shared set point parameter 342 in response to receiving an updated supervisory control strategy and/or an updated set point parameter range from the administrator user profile.

At operation 303, each parameter application unit 141A-B applies (e.g., multiplies) the shared set point parameter 342 obtained from the supervisory controller 102 to the corresponding differential pressure set point 332A-B obtained from the supervisory controller 102 in order to generate a parameterized set point 333A-B for the corresponding differential pressure sensor 131A-B. For example, parameter application unit A 141A, which is associated with the differential pressure sensor A 131A, may apply the shared set point parameter 342 to the differential pressure set point A 332A associated with the differential pressure sensor A 131A to generate a parameterized set point 333A associated with the differential pressure sensor A 131A; while parameter application unit B 141B, which is associated with the differential pressure sensor B 131B, may apply the shared set point parameter 342 to the differential pressure set point B 332B associated with the differential pressure sensor B 131B to generate a parameterized set point 333B associated with the differential pressure sensor B 131B.

Each parameter application unit 141A-B further provides its generated parameterized set point 333A-B associated with a corresponding differential pressure sensor 131A-B to the PID unit 142A-B associated with the corresponding differential pressure sensor 131A-B. For example, parameter application unit A 141A, which is associated with the differential pressure sensor A 131A, may provide its generated parameterized set point A 333A associated with the corresponding differential pressure sensor 131A to the PID unit A 142A associated with the corresponding differential pressure sensor 131A; while parameter application unit B 141B, which is associated with the differential pressure sensor B 131B, may provide its generated parameterized set point B 333B associated with the corresponding differential pressure sensor 131B to the PID unit B 142B associated with the corresponding differential pressure sensor 131B.

At operation 304, each PID unit 142A-B associated with a corresponding differential pressure sensor 131A-B generates a demand indicator 336A-B for the corresponding differential pressure sensor 131A-B based on the differential pressure reading 331A-B associated with the corresponding differential pressure sensor 131A-B and the parameterized set point 333A-B associated with the corresponding differential pressure sensor 131A-B. The demand indicator for a differential pressure sensor 133A-B may indicate a change in the operation of the HVAC system 103 (e.g., a pump rotational speed for a pump of the HVAC system 103) required and/or estimated to be required for addressing a deviation of the differential pressure reading 331A-B associated with the corresponding differential pressure sensor 131A-B from the parameterized set point 333A-B associated with the corresponding differential pressure sensor 131A-B. To generate demand indicators 336A-B, the PID units 142A-B may utilize one or more PID algorithms. In some embodiments, a PID algorithm is a control-loop-based algorithm that generates, based on proportional, integral, and derivative terms, a responsive correction in response to detecting an error value measured based on a difference between a desired set point and a measured process variable.

The PID units 142A-B may generate demand indicators 336A-B for differential pressure sensors 131A-B and provide the demand indicators to the control signal generator 143. For example, PID unit A 142A, which is associated with the differential pressure sensor A 131A, may generate a demand indicator A 336A for the differential pressure sensor A 131A based on the differential pressure sensor reading A 331A and the parameterized set point A 333A and provide the generated demand indicator A 333A to the control signal generator 143; while PID unit B 142B, which is associated with the differential pressure sensor B 131B, may generate a demand indicator B 336B for the differential pressure sensor B 131B based on the differential pressure sensor reading B 331B and the parameterized set point B 333B and provide the generated demand indicator B 336B to the control signal generator 143.

At operation 305, the control signal generator 143 generates one or more control signals 335 based on each demand indicator 336A-B received from a PID unit 142A-B. The control signals 335 may include electronic signals that, when implemented by the sequencer 144 (e.g., a pump sequencer), cause changes in the operation of the HVAC system 103 (e.g., pump rotational speed). In some embodiments, the control signal generator 143 generates the one or more control signals 335 based on a maximum demand indicator of each demand indicator 336A-B received from a PID unit 142A-B, where the maximum demand indicator may be a demand indicator showing a maximum amount of deviation between differential pressure sensor reading and parameterized set point among all of the deviations between differential pressure sensor readings and parameterized set points indicated by the demand indicators generated by the PID units 142. In this way, the control signal generator 143 may utilize needs of a branch of the distribution channel 134 having the highest demand for change in differential pressure as the basis for its change in operation of the HVAC system 103 (e.g., pump rotational speed).

At operation 306, the sequencer 144 generates one or more sequencing signals 338 based on the received demand indicators 336A-B and provides the sequencing signals 338 to the actuators 132 in order to affect the operation of the actuators 132, which in turn affects the operation of the HVAC plants 133. In some embodiments, the process 300 is performed using a feedback loop to ensure optimal operation of the HVAC system 103 over time given one or more optimization factors associated with the operation of the HVAC system 103.

Additional Example Implementation Details

Although example processing systems have been described in FIGS. 1-2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs (i.e., one or more modules of computer program instructions) encoded on computer-readable storage medium for execution by, or to control the operation of, information/data processing apparatus. Alternatively, or in addition, the program instructions can be encoded on an artificially-generated propagated command (e.g., a machine-generated electrical, optical, or electromagnetic command) which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated command, a computer-readable storage medium can be a source or destination of computer program instructions encoded in an artificially-generated propagated command. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (Application Specific Integrated Circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data (e.g., magnetic, magneto-optical disks, or optical disks). However, a computer need not have such devices. Devices suitable for storing computer program instructions and information/data include all forms of non-volatile memory, media and memory devices, including by way of example semiconductor memory devices (e.g., EPROM, EEPROM, and flash memory devices; magnetic disks, such as internal hard disks or removable disks; magneto-optical disks; and CD-ROM and DVD-ROM disks). The processor and the memory can be supplemented by, or incorporated in, special purpose logic circuitry.

To provide for interaction with a user, embodiments of the subject matter described herein can be implemented on a computer having a display device (e.g., a CRT (cathode ray tube) or LCD (liquid crystal display) monitor) for displaying information/data to the user and a keyboard and a pointing device (e.g., a mouse or a trackball, by which the user can provide input to the computer). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, or tactile input). In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component (e.g., as an information/data server), or that includes a middleware component (e.g., an application server), or that includes a front-end component (e.g., a client device having a graphical user interface or a web browser through which a user can interact with an implementation of the subject matter described herein), or any combination of one or more such back-end, middleware, or front-end components. The components of the system can be interconnected by any form or medium of digital information/data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. A computer-implemented method for performing supervisory control of a heating, ventilation, and air-conditioning (HVAC) system using a plurality of differential pressure sensors associated with the HVAC system, the computer-implemented method comprising:

obtaining a differential pressure reading from each differential pressure sensor of the plurality of differential pressure sensors;

obtaining a differential pressure set point for each differential pressure sensor of the plurality of differential pressure sensors;

applying a shared set point parameter to each differential pressure set point for a differential pressure sensor of the plurality of differential pressure sensors in order to generate a parameterized set point for the differential pressure sensor;

for each differential pressure sensor of the plurality of differential pressure sensors, generating a demand indicator for the differential pressure sensor based on the differential pressure reading from the differential pressure sensor and the parameterized set point for the differential pressure sensor; and performing the supervisory control based on at least one demand indicator for a differential pressure sensor of the plurality of differential pressure sensors.

2. The computer-implemented method of claim 1, wherein generating the demand indicator for a differential pressure sensor of the plurality of differential pressure sensors comprises generating a deviation measure between the parameterized set point for the differential pressure sensor and the differential pressure reading from the differential pressure sensor.

3. The computer-implemented method of claim 1, wherein the shared set point parameter is selected from a configurable differential pressure range associated with the HVAC system.

4. The computer-implemented method of claim 1, wherein:

each differential pressure sensor of the plurality of differential pressure sensors is associated with a distribution branch of a plurality of distribution branches associated with the HVAC system, and the demand indicator for a differential pressure sensor of the plurality of differential pressure sensors indicates whether the building branch associated with the differential sensor is in a comfort state as defined by the parameterized set point for the differential pressure sensor.

5. The computer-implemented method of claim 1, wherein:

each differential pressure sensor of the plurality of differential pressure sensors is associated with a local pressure controller associated with the HVAC system, and performing the supervisory control comprises modifying operation of the local pressure controller of the plurality of local pressure controllers.

6. The computer-implemented method of claim 1, wherein performing the supervisory control comprises:

identifying a maximum amount of deviation between differential pressure sensor readings of the plurality of differential pressure sensors having a maximum demand indicator; and performing the supervisory control based on the maximum demand indicator.

7. The computer-implemented method of claim 1, wherein the shared set point parameter is determined based on an existing set point range associated with the HVAC system.

8. The computer-implemented method of claim 1, further comprising:

obtaining an updated set point range associated with the HVAC system;

applying the updated shared set point parameter to each differential pressure set point for a differential pressure sensor of the plurality of differential pressure sensors in order to generate an updated parameterized set point for the differential pressure sensor;

for each differential pressure sensor of the plurality of differential pressure sensors, generating an updated demand indicator for the differential pressure sensor based on the differential pressure reading from the differential pressure sensor and the updated parameterized set point for the differential pressure sensor; and performing the supervisory control based on at least one updated demand indicator for a differential pressure sensor of the plurality of differential pressure sensors.

9. An apparatus comprising at least one processor and at least one non-transitory memory comprising program code, wherein the at least one non-transitory memory and the program code are con-figured to, with the at least one processor, cause the apparatus to at least perform a method for performing supervisory control of a heating, ventilation, and air-conditioning (HVAC) system using a plurality of differential pressure sensors associated with the HVAC system, the method comprising:

obtaining a differential pressure reading from each differential pressure sensor of the plurality of differential pressure sensors;

obtaining a differential pressure set point for each differential pressure sensor of the plurality of differential pressure sensors;

applying a shared set point parameter to each differential pressure set point for a differential pressure sensor of the plurality of differential pressure sensors in order to generate a parameterized set point for the differential pressure sensor;

for each differential pressure sensor of the plurality of differential pressure sensors, generating a demand indicator for the differential pressure sensor based on the differential pressure reading from the differential pressure sensor and the parameterized set point for the differential pressure sensor; and performing the supervisory control based on at least one demand indicator for a differential pressure sensor of the plurality of differential pressure sensors.

10. The apparatus of claim 9, wherein generating the demand indicator for a differential pressure sensor of the plurality of differential pressure sensors comprises generating a deviation measure between the parameterized set point for the differential pressure sensor and the differential pressure reading from the differential pressure sensor.

11. The apparatus of claim 9, wherein the shared set point parameter is selected from a configurable differential pressure range associated with the HVAC system.

12. The apparatus of claim 9, wherein:
each differential pressure sensor of the plurality of differential pressure sensors is associated with a distribution branch of a plurality of distribution branches associated with the HVAC system, and
the demand indicator for a differential pressure sensor of the plurality of differential pressure sensors indicates whether the building branch associated with the differential sensor is in a comfort state as defined by the parameterized set point for the differential pressure sensor.

13. The apparatus of claim 9, wherein:
each differential pressure sensor of the plurality of differential pressure sensors is associated with a local pressure controller associated with the HVAC system, and
performing the supervisory control comprises modifying operation of the local pressure controller of the plurality of local pressure controllers.

14. The apparatus of claim 9, wherein performing the supervisory control comprises:
identifying a maximum amount of deviation between differential pressure sensor readings of the plurality of differential pressure sensors having a maximum demand indicator; and
performing the supervisory control based on the maximum demand indicator.

15. The apparatus of claim 9, wherein the shared set point parameter is determined based on an existing set point range associated with the HVAC system.

16. The apparatus of claim 9, further comprising:
obtaining an updated set point range associated with the HVAC system;
applying the updated shared set point parameter to each differential pressure set point for a differential pressure sensor of the plurality of differential pressure sensors in order to generate an updated parameterized set point for the differential pressure sensor;
for each differential pressure sensor of the plurality of differential pressure sensors, generating an updated demand indicator for the differential pressure sensor based on the differential pressure reading from the differential pressure sensor and the updated parameterized set point for the differential pressure sensor; and
performing the supervisory control based on at least one updated demand indicator for a differential pressure sensor of the plurality of differential pressure sensors.

17. A non-transitory computer storage medium comprising instructions configured to cause one or more processors to at least perform a method for performing supervisory control of a heating, ventilation, and air-conditioning (HVAC) system using a plurality of differential pressure sensors associated with the HVAC system, the method comprising:

obtaining a differential pressure reading from each differential pressure sensor of the plurality of differential pressure sensors;

obtaining a differential pressure set point for each differential pressure sensor of the plurality of differential pressure sensors;

applying a shared set point parameter to each differential pressure set point for a differential pressure sensor of the plurality of differential pressure sensors in order to generate a parameterized set point for the differential pressure sensor;

for each differential pressure sensor of the plurality of differential pressure sensors, generating a demand indicator for the differential pressure sensor based on the differential pressure reading from the differential pressure sensor and the parameterized set point for the differential pressure sensor; and performing the supervisory control based on at least one demand indicator for a differential pressure sensor of the plurality of differential pressure sensors.

18. The non-transitory computer storage medium of claim 17, wherein generating the demand indicator for a differential pressure sensor of the plurality of differential pressure sensors comprises generating a deviation measure between the parameterized set point for the differential pressure sensor and the differential pressure reading from the differential pressure sensor.

19. The non-transitory computer storage medium of claim 17, wherein the shared set point parameter is selected from a configurable differential pressure range associated with the HVAC system.

20. The non-transitory computer storage medium of claim 17, wherein:
 each differential pressure sensor of the plurality of differential pressure sensors is associated with a distribution branch of a plurality of distribution branches associated with the HVAC system, and
 the demand indicator for a differential pressure sensor of the plurality of differential pressure sensors indicates whether the building branch associated with the differential sensor is in a comfort state as defined by the parameterized set point for the differential pressure sensor.

* * * * *